United States Patent [19]

Greer

[11] Patent Number: 5,442,995
[45] Date of Patent: Aug. 22, 1995

[54] APPARATUS FOR HEAT PROCESSING FOODSTUFF

[75] Inventor: David G. Greer, Anoka, Minn.

[73] Assignee: BioChem, Inc., Anoka, Minn.

[21] Appl. No.: 156,031

[22] Filed: Nov. 19, 1993

[51] Int. Cl.$^6$ ............................................. A23N 17/00
[52] U.S. Cl. ...................................... 99/487; 99/516; 99/536
[58] Field of Search ................................. 99/485–487, 99/489, 516, 534, 536, 468, 471, 473, 483; 134/132; 426/231, 506, 507, 511, 454, 455

[56] References Cited

U.S. PATENT DOCUMENTS

| | | | |
|---|---|---|---|
| 3,682,665 | 11/1969 | Diaz . | |
| 3,886,856 | 6/1975 | Paugh . | |
| 3,997,681 | 12/1976 | Guyer . | |
| 4,508,029 | 4/1985 | Malone . | |
| 4,561,347 | 12/1985 | Zaitu . | |
| 4,661,365 | 4/1987 | Malone . | |
| 4,699,797 | 10/1987 | Fast . | |
| 4,898,092 | 2/1990 | Greer . | |
| 4,899,648 | 2/1990 | Fast . | |
| 4,993,316 | 2/1991 | Greer ........................ | 99/487 |
| 5,194,275 | 3/1993 | Greer ........................ | 426/231 |

Primary Examiner—Timothy F. Simone
Attorney, Agent, or Firm—Burd Bartz & Gutenkauf

[57] ABSTRACT

An apparatus for the heat processing of foodstuff to improve the palatability thereof. The apparatus includes an oven housing defining an oven chamber having a material inlet and a material outlet. A tubular means extends between the material inlet and the material outlet for carrying the foodstuff during the cooking process. The tubular means is preferably comprised as a bank of interconnected augers. Control of the speed of the auger assembly determines the duration during which the foodstuff is subject to the heat processing. A fluid conduit system provides heated gases to the oven housing for purposes of heat processing or cooking the foodstuff. A blower is connected to the fluid conduit for moving the gases. A heater module provides heated gases to the fluid conduit and controls the temperature thereof. A moisture conditioning apparatus can be used to control the moisture content of the incoming foodstuff thereby controlling all of the process variables for the heat processing of foodstuff.

25 Claims, 5 Drawing Sheets

APPARATUS FOR HEAT PROCESSING FOODSTUFF

BACKGROUND OF THE INVENTION

The invention relates to the heat processing or "cooking" of foodstuff materials such as grain in the formulation of human food or animal feed. Foodstuff materials are routinely heat processed to increase their food/feed value. The goal of such heat processing is to improve palatability and digestibility, and to sterilize the feed/food. In heat processing of such foodstuffs, there are three process variables. These are moisture content of the foodstuff, process temperature, and the length of time that the foodstuff is heated. The better the control over these process variables, the better and more uniform are the results achieved in the heat treating process with attendant energy savings.

A common apparatus and method of heat processing of a foodstuff includes heat processing of feed grain. This involves the injection of live steam into a mass of grain in a steam chest or conditioning chamber. The steam is discharged at essentially atmospheric pressure, limiting the operating temperature to approximately 210° F. This has several disadvantages. While boilers are quite common, they can also be dangerous and require regular safety inspections; a properly licensed operator; a supply of properly treated water for steam generation; and specialized service people available to maintain the boiler. The heat transfer efficiency and rate of cooking the grain are seriously limited by the operating temperature of the steam, since they are governed in large part by the temperature differential between the heat source and the grain. Control of the equipment is for the most part manual, whereby the process is labor-intensive and the quality of the resultant product is largely operator dependent. The steam chest typically has a cross-sectional area of several square feet and a vertical gravity flow with limited means available for mixing. Temperature gradients and "channeling" of the steam can occur, to negatively affect the uniformity of the cooked grain. Start up and shut down times are energy wasting. The introduction of boiler water chemicals into the feed is an extraneous factor of unknown response in the recipient animal. In this process, the three cooking variables cannot be separated and controlled individually making the use of modern process controllers impossible.

SUMMARY OF THE INVENTION

The invention pertains to an apparatus for heat processing or cooking of foodstuffs to improve the value of the foodstuff for human food or animal feed purposes. The apparatus carefully monitors and controls the normal process variables involved in the cooking of foodstuff, those of moisture content, processing or cooking temperature, and time duration, to achieve optimum and uniform cooking. Foodstuffs being processed can be such foodstuff material as whole kernel soybeans, crushed or ground grain or soybeans, mixtures of feed ingredients, and the like. A foodstuff conditioning apparatus can be provided in order to raise the moisture content of incoming foodstuff to be processed, to an optimum target moisture content for introduction into the foodstuff heating component. This removes moisture content as an uncontrolled variable from the cooking process. The heat processing apparatus includes an oven housing defining an oven chamber. The foodstuff travels through the oven chamber in an enclosed conveyance means where it is subjected to high temperature for cooking purposes. The conveyance means can include a stacked set of interconnected mixing augers. The rotational speed of the mixing augers controls the time duration of cooking.

The apparatus includes a heat source, a heat transfer fluid, a cooking chamber, a fluid pump or blower, a fluid inlet to and outlet from the cooking chamber, and a heat transfer fluid heating chamber. Heat is transferred from the heat source to the heat transfer fluid in the fluid heating chamber. The heated fluid is moved by pump or blower into the cooking chamber through its fluid inlet where the fluid circulates over the material conveyance means, and out through the fluid outlet. The fluid then returns to the heat transfer heating chamber to begin the cycle again. The temperature of the heat transfer fluid is precisely controlled by monitoring its temperature and modulating the heat source.

In one preferred embodiment, the apparatus of the invention comprises a heat treating apparatus for grain. The heat transfer fluid is either air or a gaseous mixture of air and combustion gas.

DESCRIPTION OF A PREFERRED EMBODIMENT

Referring to the drawings, there is shown in FIGS. 1–4, a foodstuff heat processing apparatus according to the invention indicated generally at 10. The apparatus 10 is described herein as heat processing grain although the apparatus could, with little or no alteration, heat process other foodstuffs as discussed earlier. Apparatus 10 has as component sub-systems a moisture conditioning apparatus 11 and a heating component 12. The purpose of moisture conditioning apparatus 11 is to accurately raise the moisture content of incoming grain or other feedstuffs, in either whole kernel or crushed form, to a desired target moisture content optimal for the heat treating process. Moisture conditioning apparatus 11 can be like that shown and described in U.S. Pat. No. 4,898,092, issued Feb. 6, 1990, entitled FEED GRAIN CONDITIONING APPARATUS and incorporated herein by reference. The moisture content of the grain, as introduced to the cooking apparatus and the cooking process, becomes a readily and automatically controlled variable in the foodstuff cooking process.

Figure 1:
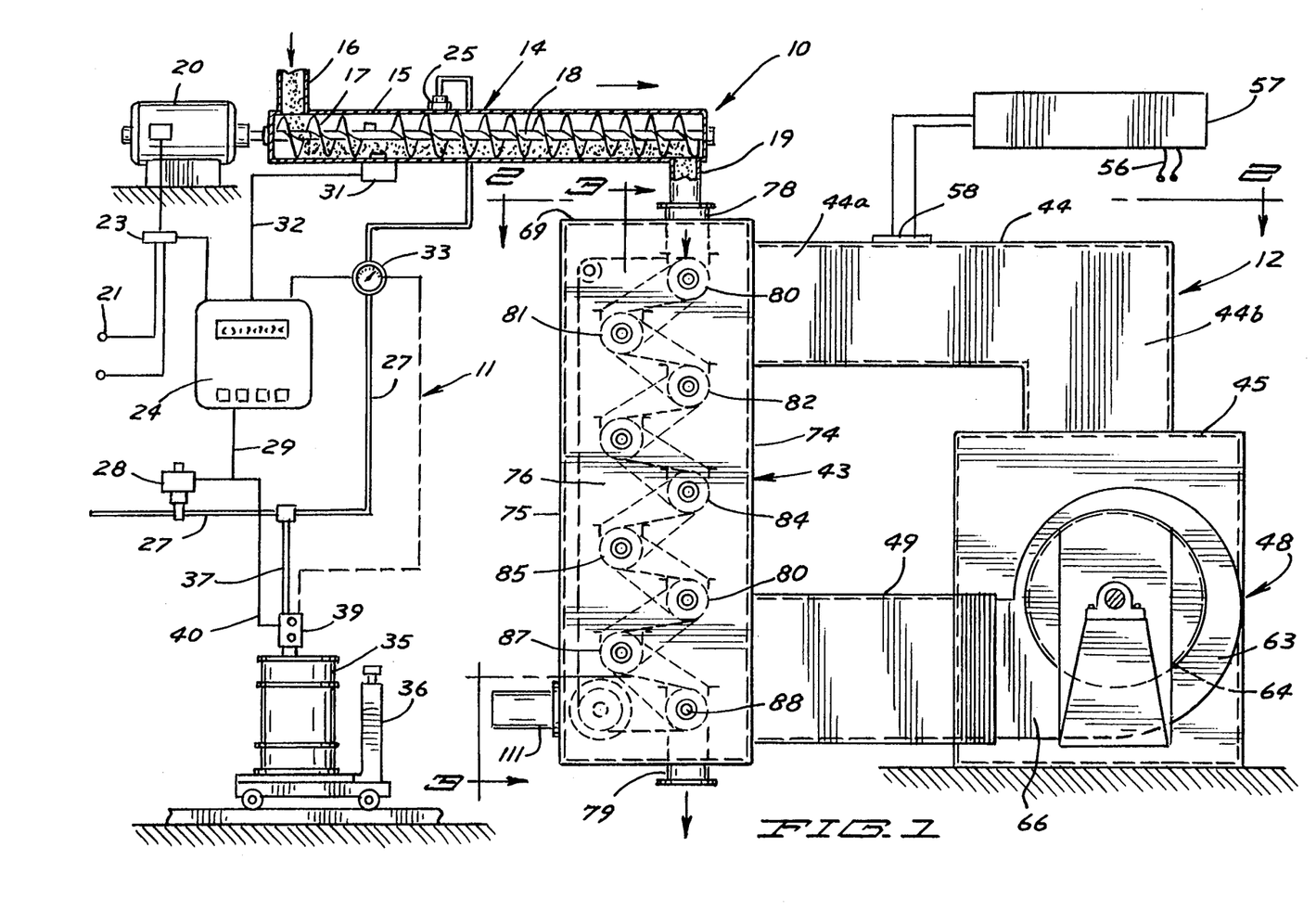
FIG. 1 is a side elevational view of an automated grain heat processing apparatus according to one preferred embodiment of the invention shown as including a grain conditioning apparatus together with a grain cooking apparatus.

Moisture conditioning apparatus 11 includes a transport/mixing auger 14 having an auger housing 15 containing a rotatable shaft 18 carrying an auger flight 17. A grain inlet conduit 16 is located at the upstream end of auger 14, and a grain outlet conduit 19 is located at the downstream end. An electric motor 20, powered through electrical source 21, drives auger shaft 18. An electric load sensor 23 senses the electrical load required by motor 20 to power shaft 18. This load varies according to the mass flow of grain being transferred. Load sensor 23 is connected to a control panel 24 for operation, by way of example, in accordance with the teachings of U.S. Pat. No. 5,194,275, issued Mar. 16, 1993, incorporated herein by reference. Load sensor 23 could be installed elsewhere such as on an elevator leg delivering the grain to the mixing auger 14.

A spray apparatus 25 is connected to auger housing 15 for application of moisture to grain passing through auger housing 15. Moisture is derived from a water supply line 27 connected to an external supply of water (not shown). A moisture sensor 31 is connected to auger housing 15 positioned to measure the moisture content of a sample of incoming grain at a location upstream of spray apparatus 25. Moisture sensor 31 is connected by a control line 32 to the control panel 24.

An automatic valve or proportional flow control valve 28 is connected to water supply line 27 to regulate the volumetric flow of water. A water valve control line 29 is connected between control of valve 28 and control panel 24. An additive container 35 is mounted on a scale 36 to measure depletion thereof, and is connected to an additive supply pump 39. An additive supply line 37 connects additive container 35 through additive pump 39 to water supply line 27 at a location downstream of water pump 28. Container 35 will typically contain a surfactant for addition to the water to enhance the wetting characteristics of the water with respect to the grain. Additive pump 39 is connected by an additive pump control line to control panel 24.

The use of moisture conditioning apparatus 11 is as described in the previously references patents, and generally includes the introduction of foodstuff such as whole kernel grain, whole soybeans, crushed or ground grain, or soybeans or mixtures of ingredients to the inlet conduit 16 of auger housing 15. The moisture content of incoming grain will vary considerably and the object is to raise the moisture content of the grain to an approximate target value prior to introduction into the cooking process. The system is calibrated according to the type of grain being conditioned.

Grain is introduced through conduit 16 into auger housing 15 where it is moved in a downstream direction by the auger flight 17. Moisture sensor 31 senses the moisture of the incoming grain and generates an electrical signal also passed to control panel 24. The electric load sensor generates an electrical signal also passed to control panel 24 which computes the proper moisture addition rate from these two signals. This computed signal is used to regulate the amount of water or water-surfactant solution applied to the grain at the wetting station where spray apparatus 25 is located. The resultant grain that passes through outlet conduit 19 is introduced to the cooking process at a controlled and relatively precise moisture content.

Heating component 12 is associated with the moisture conditioning apparatus 11 for receipt of grain at a target moisture content, preparatory to heat processing or cooking. Heating component 12 includes an oven housing 43 defining an oven chamber; fluid conduits including an L-shaped recirculation duct 44; a fluid inlet duct 49; and a plenum housing 45 defining a plenum chamber. The heating component also includes a heater module 47, and a blower unit 48.

Heater module 47 includes a combustion housing 51 having a combustion chamber 52. A heater shown as a gas burner 53 is mounted in the combustion chamber 52 and is modulated by a burner control 55. Burner control 55 is connected by control lines 56 to heating component control panel 57 (FIG. 1). Other heaters could be used such as oil burning or electric. The embodiment of the invention shown contemplates air or air with combustion gases as the heat transfer medium. Alternate fluid media could be employed.

Air intakes 59 admit air to the combustion chamber 52 for purposes of combustion. Combustion chamber 52 is connected to the plenum chamber 60 of plenum housing 45. The outlet of the plenum chamber 60 is connected to the blower unit 48 by a transition duct 61.

Figure 2:
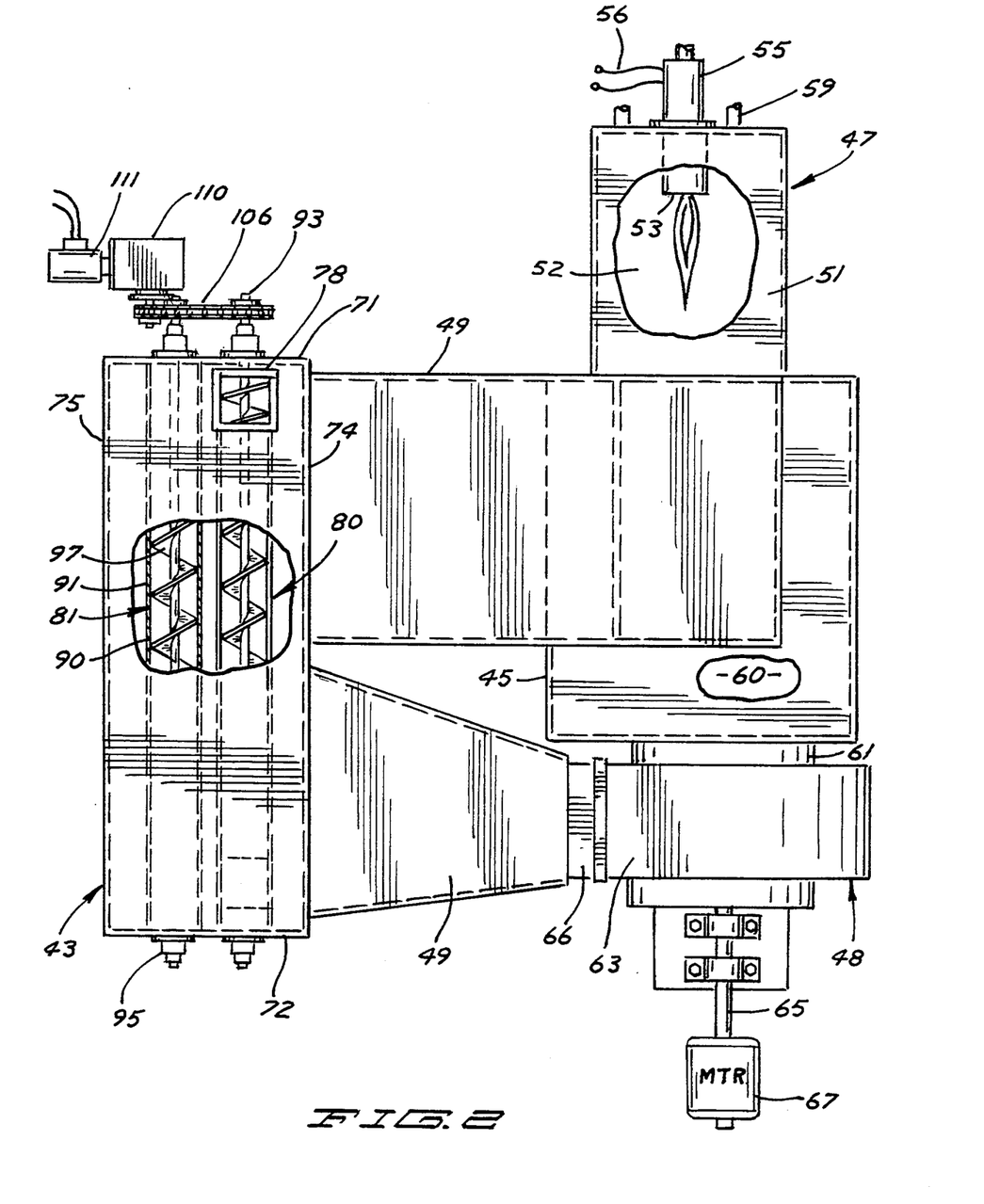
FIG. 2 is an enlarged top plan view of a portion of the grain heat processing apparatus of FIG. 1 taken along the line 2—2 thereof and shown partly fragmented for purposes of illustration.

Blower unit 48 includes a blower housing 63 containing a fan 64 driven by a shaft 65 connected to an electric motor indicated at 67 in FIG. 2. The term "blower" is used generically and is meant to include any positive displacement fluid movement device or the equivalent.

Blower unit 48 has an outlet nozzle 66 for directing heated gases to oven housing 43. The nozzle 66 connects to fluid inlet duct 49. Fluid inlet duct 49 is open to the oven housing 43 at a lower portion thereof, as shown in FIG. 1. The inlet to the recirculation duct 44 connects to the oven housing 43 and an upper portion thereof at a location diagonal to the inlet duct 49. The recirculation duct 44 extends horizontally from the oven housing 43 at a first leg 44A, and then vertically to the plenum housing 45 at a vertical leg 44B.

Figure 3:
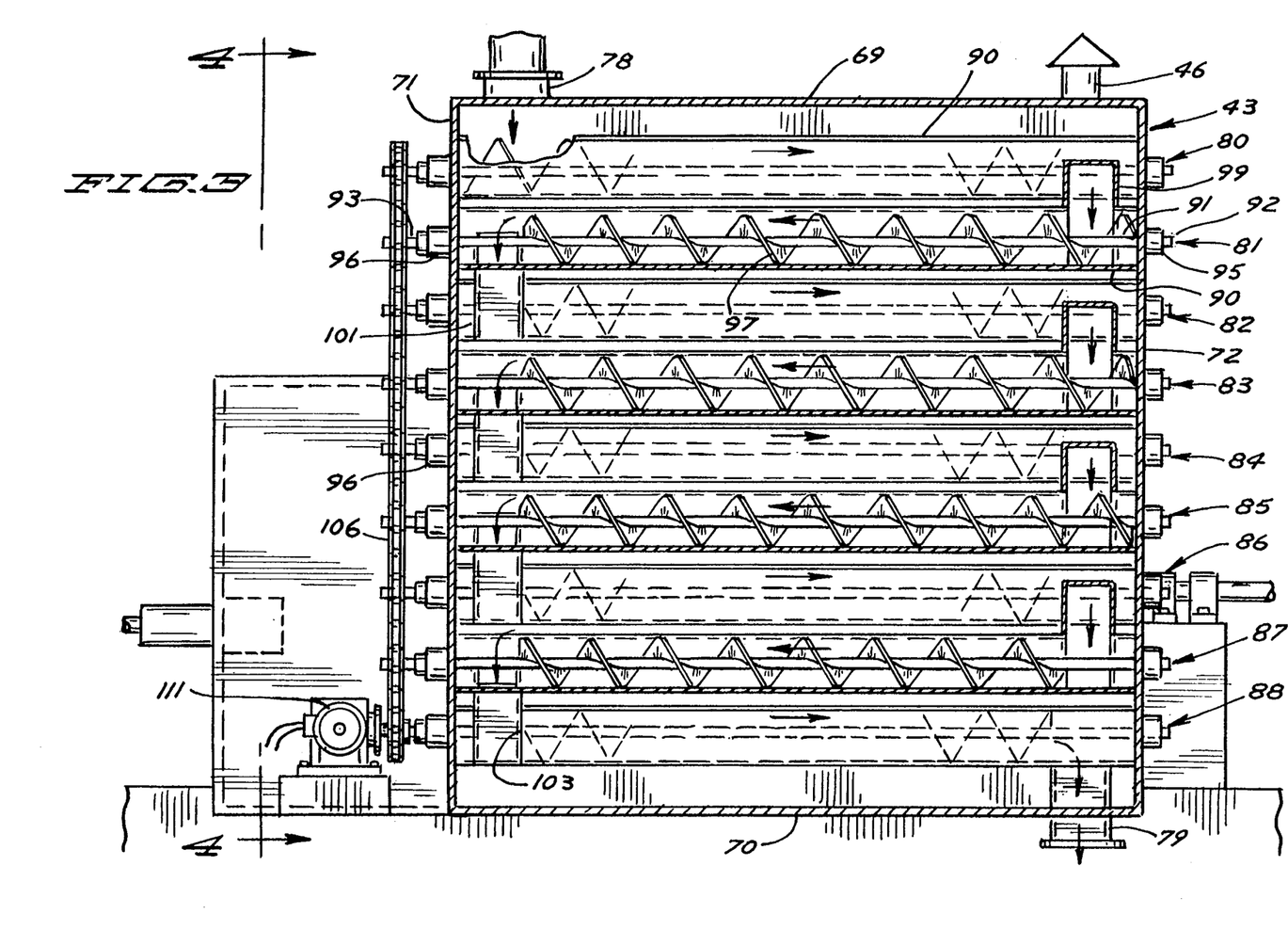
FIG. 3 is an enlarged sectional view of the oven housing of the grain heat processing apparatus of FIG. 1 taken along the line 3—3 thereof.

Oven housing 43 is comprised of a cabinet-type structure having top and bottom walls 69, 70 and side walls comprised as first and second lateral end walls 71, 72 and front and rear walls 74, 75 defining an oven chamber 76. A vent 46 is provided for expelling excess combustion gases. Inlet duct 49 communicates with the oven chamber 76 through an inlet opening in the lower portion of the front side wall 74. The horizontal leg 44A of the recirculation duct extends from an outlet opening located in the upper portion of the front wall 44.

Oven housing 43 has an inlet for material to be heat processed, an outlet for discharge of treated material, and an enclosed conveyor means to transport material through the oven chamber between the inlet and the outlet for a controlled time period to subject it to heat for the purpose of processing it.

A material inlet duct 78 is installed in the top wall 69 of oven housing 43. Material inlet duct 78 receives grain from the grain conditioning apparatus 11 either directly, as by being directly connected to the outlet conduit 19 of the grain conditioning apparatus 11, as shown in FIG. 1, or, more typically, as by being connected to the outlet through an intermediate structure such as a surge bin, like that shown FIG. 5. A material outlet duct 79 is installed in the bottom wall 70 of oven housing 43. Outlet duct 79 discharges the cooked grain to a suitable destination such as a flaker, roller mill or pellet mill.

Grain is transported by enclosed conveyor means between the material inlet 78 and the material outlet 79 for a controlled time interval for precise cooking of the grain. The enclosed conveyor includes a mixing auger assembly installed in housing 43 and having a stacked set of generally horizontally oriented interconnected augers. A plurality of augers 80-88 are installed between the end walls 71, 72 of housing 43. First through ninth augers 80-88 are vertically spaced apart from one another. As shown in FIG. 1, the axes of augers 80-88 are not only vertically spaced, but also are alternately horizontally staggered from one another.

The several transport/mixing augers are alike in construction. Viewing the second auger 81 as exemplary, it has a closed auger housing 90 extended horizontally between the interior surfaces of the end walls 71, 72 of housing 43. An auger shaft 91 extends centrally through the housing 90 having ends 92, 93 that extend outwardly of the end walls 71, 72, respectively, of oven housing 43. Bearing assemblies 95, 96 are mounted to the ends 92, 93 of the auger shaft 91 and are secured to the end walls 71, 72 for rotational movement of the shaft 91. An auger flight 97 is secured to the auger shaft 91 in conventional fashion. Upon rotation of the auger shaft 91, grain is moved in a downstream direction through the auger housing 90.

The several auger housings of augers 80-88 are interconnected for sequential transfer of grain from one to the next during the heat treating process. Inlet duct 78 opens to the upstream end of the housing of the first or uppermost auger 80. The upstream end of each subsequent auger housing is connected to the downstream end of the auger housing disposed next vertically above it. A first tubular connector 99 connects the interior of the auger housing of the first auger 80 to the interior of the auger housing of the second auger 81. A second tubular connector 101 is connected between the second and third augers 81, 82 connecting the downstream end of the auger housing of the second auger 81 to the upstream end of the auger housing of the third auger 82. The connection continues so forth between vertically adjacent augers. A final tubular connector 103 connects the downstream end of the housing of the eighth auger 87 to the upstream end of the housing of the ninth auger 88. The outlet duct 79 connects to the auger housing of the ninth auger 88 at the downstream end thereof for discharge of grain. Grain entering the material inlet duct 78 travels the length of each of the augers, being transferred through the tubular connector at the end of the auger to the next lower auger housing. At the same time, the grain is tumbled for uniformity of heating. The auger housings are preferably of a material having a high coefficient of heat transfer, such as steel or stainless steel. Heat from the surrounding oven cabinet is transferred through the auger housing skin to the passing grain for purposes of heat processing or cooking the grain. Speed of the auger flights determines the grain velocity passing through the various auger housings, and accordingly, the cooking time.

Figure 4:
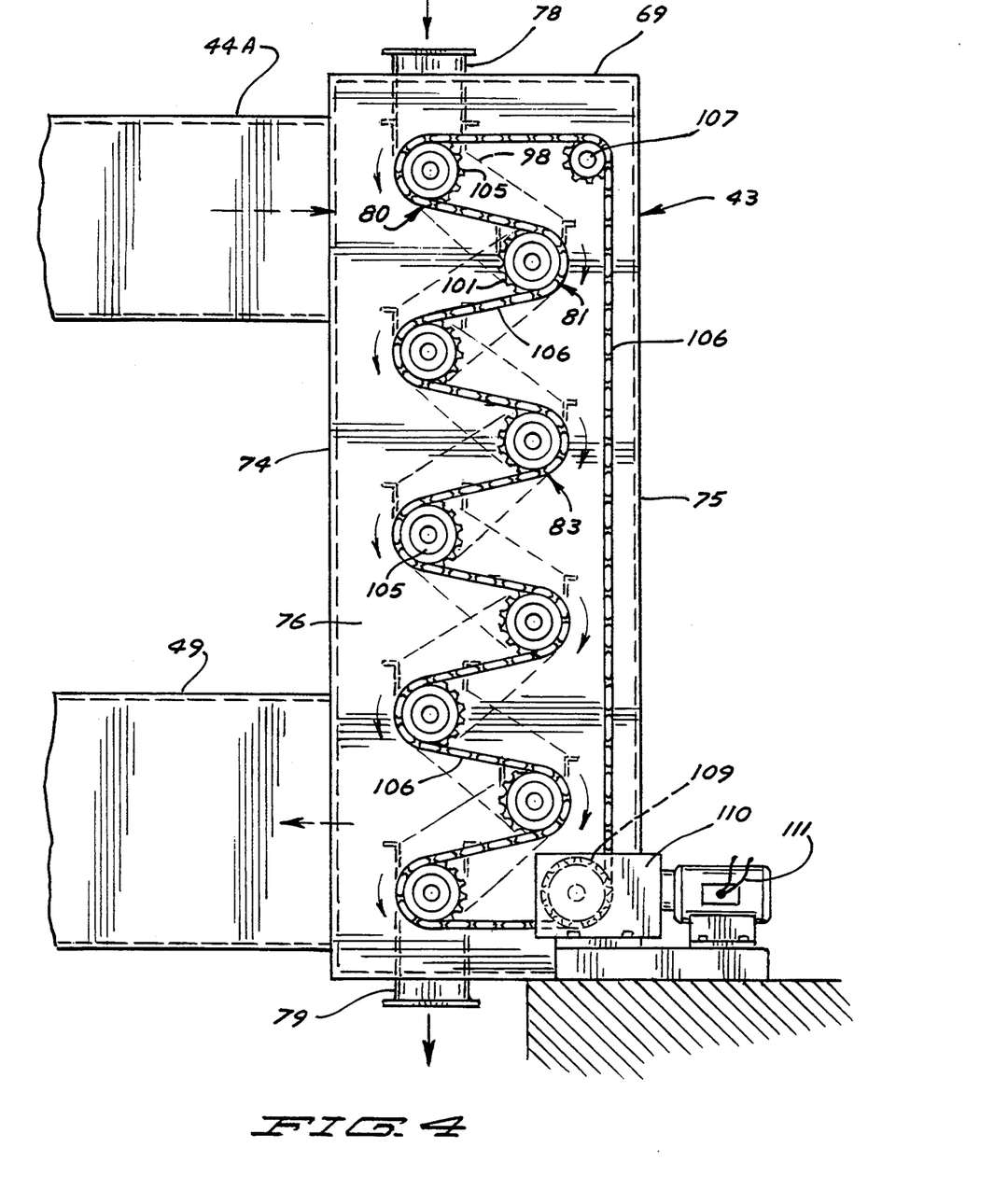
FIG. 4 is an enlarged sectional view of a portion of the grain heat processing apparatus of FIG. 3 taken along the line 4—4 thereof.

One end 93 of each auger shaft extends outwardly of the end wall 71 and bearing assembly 96 for engagement with a drive means. The end 93 of each auger shaft is equipped with a sprocket 105 (FIG. 4). A sprocket chain 106 is trained over sprockets 105 and over an idler sprocket 107 fastened to the housing 43, and over a power sprocket 109. Power sprocket 109 is connected to a transmission assembly 110, which is connected to a variable speed electric motor 111. Operation of motor 111 is effective to drive power sprocket 109 to move chain 106. This powers drive sprockets 105 to rotate the various auger shafts. As shown, sprocket chain 106 is alternately trained over the drive sprockets in a fashion that will cause alternate auger shafts to rotate in opposite directions. The auger flights on the respective auger shafts are oriented to move grain in the pre-selected downstream direction upon rotation of the auger shaft by sprocket chain 106. Electric motor 111 is connected to control panel 57.

In the operation of the heating treating apparatus, grain having a moisture content elevated to a target moisture content as previously described, is introduced to the grain heating component 12 at the inlet 78. Precise control of the moisture content of the incoming grain closely regulates one of the variables in the heat treating or cooking process. A fully moisturized grain kernel allows for more efficient internal heat transfer and starch gelatinization.

Burner 63 and blower 64 are operated to heat gas and move it through oven housing 43 along a path through the fluid inlet duct 49, through the oven chamber 76 of oven housing 43, through the recirculation duct 44 and to the plenum 45. Baffles 50 can be installed in oven chamber 76 to promote gas circulation. A temperature sensor 58 measures the gas temperature in the recirculation duct 44 and provides it to the control panel 57. Control panel 57 accordingly regulates the burner 53 to introduce hot gases to plenum 45 to closely regulate the temperature of the gases that circulate through oven housing 43. The temperature in the oven chamber is precisely controlled by modulating burner 63 and recirculating the hot combustion gases. Regulation of this temperature closely controls another variable in the cooking process.

Grain introduced at the material inlet duct 78 of oven housing 43 travels through the bank of heat treating augers provided therein. While travelling through the auger housings, the grain is exposed to heat and is cooked. The time duration of cooking is determined by the operational speed of the augers. Control of the operational speed of the augers provides regulation of the third variable in the cooking process.

In the grain cooking system according to the invention, the three process variables encountered in heat treating of grain, moisture content, process temperature, and the length of time that the grain is heated, have been separated and are continuously monitored and precisely controlled. The pre-moisturization of the grain kernel allows for more efficient internal heat transfer and starch gelatinization. Elimination of the intermediate step of using heat to create steam then to cook the grain, results in energy saving of between 15% and 20%. The processing temperature is not limited to 212° F. as with steam injection at atmospheric pressure, thus making significantly greater differentials possible with corresponding energy savings. Further energy savings are realized due to the efficient heat transfer through the uniformly moistened grain kernels.

Figure 5:
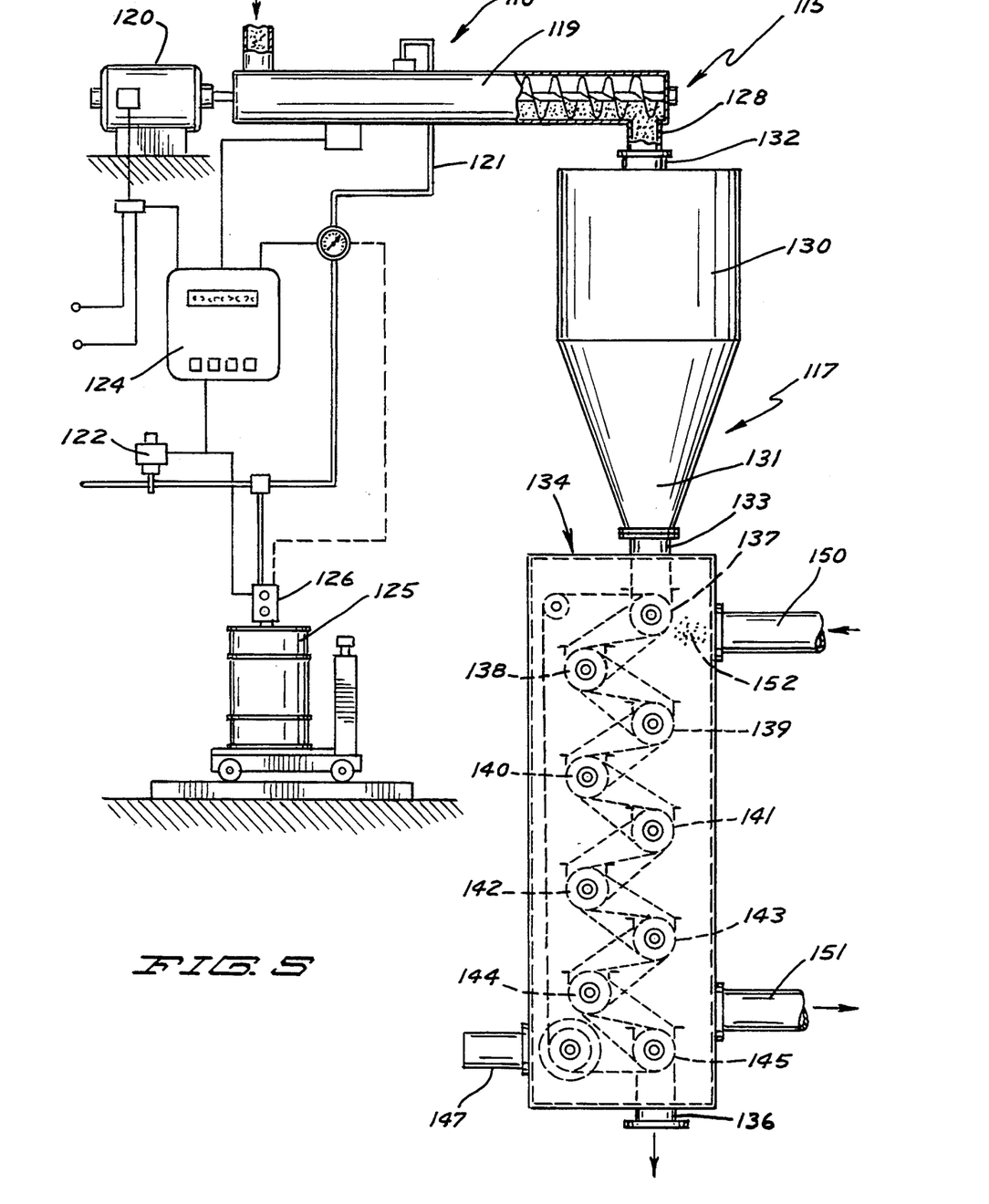
FIG. 5 is a side elevational view like that of FIG. 1, showing an alternative embodiment of a grain heat processing apparatus.

An alternative embodiment of a grain heat processing apparatus according to the invention is shown in FIG. 5 and indicated at 115. The apparatus includes a grain conditioning component 116 and a grain cooking component 117. The grain conditioning component 116 includes a transport auger 119 powered by an electric motor 120. A water or water surfactant combination is applied to the grain through a water line 121. Flow of water is controlled by a proportionate flow control valve 122 connected to a control panel 124. A surfactant is introduced to the water line from a surfactant supply 125 through use of a surfactant pump 126. The discharge 128 of the transport/mixing auger 119 empties into a surge bin 130. Grain entering the surge bin 130 is at a very carefully controlled moisture content.

An oven housing 134 is comprised of a cabinet-type structure having top, bottom and side walls as earlier described with respect to the oven housing 143 in FIG. 1. Oven housing 134 has a material inlet duct 133 that is connected to the outlet 131 of the surge bin 130. The oven housing 134 has a grain outlet 136. The inlet and outlet are connected by a closed tubular grain transport means which includes a transport auger assembly having a stacked set of augers, horizontally orientated grain transport augers 137–145. The augers are vertically staggered and are like those shown with respect to the first embodiment of the invention, shown in FIGS. 1–4. The auger shafts of the augers are interconnected and driven by a common electric motor 147.

A steam inlet pipe 150 is connected to the oven housing 134 and open thereto at an upper portion of the housing. A steam outlet pipe 151 extends from a lower portion of the housing 134 to permit egress of steam. As grain enters the oven housing 134 through the surge bin 130 and the inlet 133, it travels through the various enclosed auger housings of the transport augers 137–145. Steam 152 from a suitable source (not shown) is injected through the steam inlet pipe 150 and circulates throughout the housing 134, and exits through the steam outlet pipe 151. The steam cooks the grain travelling through the augers by heating the housings of the augers whereby heat is transferred through the housing to the grain.

Steam is a desirable gas as a heating medium because it is readily available and non-polluting. It is not corrosive to the apparatus components with which it has contact.

While there has been shown and described two embodiments of the invention, it is apparent that deviations can be had without departing from the scope and spirit of the invention.

The embodiments of the invention in which an exclusive property or privilege is claimed are defined as follows:

1. A heat processing apparatus for foodstuffs, comprising:
   an oven housing having walls defining an oven chamber;
   a material inlet to the oven chamber and a material outlet from the oven chamber;
   enclosed tubular means in the oven chamber connected at one end to the material inlet and at another end to the material outlet;
   material conveying means associated with the tubular means to move the foodstuff from the grain inlet to the grain outlet;
   a fluid inlet to the housing;
   a fluid outlet from the housing;
   a fluid conduit between the fluid inlet and fluid outlet exterior to the oven housing, for circulation of a heated fluid in the oven housing for heat treating the grain as it is moved through the tubular means;
   a heater module connected to the fluid conduit for heating fluid contained therein;
   blower means connected to the fluid conduit to move fluid through the fluid conduit and circulate the fluid through the oven housing for heat processing foodstuffs being carried in the tubular means.

2. The heat processing apparatus for foodstuffs of claim 1 wherein:
   said tubular means and material conveying means include an auger assembly.

3. The heat processing apparatus for foodstuffs of claim 2 wherein:
   said auger assembly includes a bank of horizontally disposed augers having interconnected auger housings for movement of foodstuffs from one auger housing to the next, said augers having auger flights installed in the auger housings, and including means for regulation of the rotational speed of the auger flights to regulate the speed of movement of foodstuffs.

4. The heat processing apparatus for grain of claim 3 wherein:
   said material inlet is located at an upper portion of the oven housing, said material outlet located at the lower portion of the oven housing, said material inlet being connected to a first of said auger housings at an upstream end thereof, said auger housings being connected to one another with the downstream end of each auger being connected by a tubular connection to the upstream end of the next downstream auger, the last auger being connected to the material outlet at the downstream end thereof.

5. The heat processing apparatus for foodstuffs of claim 4 including:
   sprocket and chain drive means to power the augers.

6. The heat processing apparatus for foodstuffs of claim 5 wherein:
   the fluid used by the apparatus to heat the grain is air and combustion gases and wherein said heater module is comprised as a combustion burner.

7. The apparatus for heat processing of foodstuffs of claim 6 wherein:
   said blower means is comprised as a blower.

8. The apparatus for heat processing of foodstuffs of claim 7 wherein:
   said fluid conduit includes a fluid inlet duct extended between the blower and a lower portion of the oven housing, and a recirculation duct extending from an upper portion of the oven housing, a plenum housing, said recirculation duct extending to the plenum housing, said plenum housing being connected to the blower, said combustion burner being connected to the plenum housing.

9. The apparatus for heat processing of foodstuffs of claim 8 including:
   a moisture conditioning means connected to the material inlet of the oven housing outside of the housing, to raise the moisture content of foodstuff intended for heat processing to a preselected target moisture content.

10. An apparatus for heat processing of foodstuffs comprising:
    an oven housing having walls defining a closed oven chamber;
    a material inlet to the oven chamber at an upper portion thereof;
    a material outlet from the oven chamber at a lower portion thereof;
    tubular means located in the oven chamber connected at one end to the material inlet and at another end to the material outlet and being enclosed within the oven chamber, for movement of the foodstuffs between the material inlet and the material outlet while exposing the foodstuffs to heat for purposes of heat processing it;
    material conveying means associated with the tubular means;

a fluid conduit for the circulation of heated gases through the oven chamber including a fluid inlet duct connected to the oven housing and open to a lower portion of the oven chamber, a recirculation duct connected to the oven housing at an upper portion thereof and open to the oven chamber, a plenum housing having a plenum chamber, a blower means, the downstream end of the recirculation duct being connected to the plenum housing, said plenum housing being connected to the blower means and said blower means being connected to the inlet duct;

a heater module connected to the plenum housing to provide heated gases to the plenum housing.

11. The apparatus for heat processing of foodstuffs of claim 10 wherein:

said tubular means and said material conveying means include an auger assembly.

12. The apparatus for heat processing of foodstuffs of claim 11 wherein:

said auger assembly includes a bank of augers having interconnected auger housings, each auger having an auger shaft, each said shaft carrying an auger flight within the auger housing for movement of foodstuffs therein in a downstream direction toward the grain outlet.

13. The apparatus for heat processing of foodstuffs of claim 12 wherein:

said bank of augers includes a plurality of augers generally horizontally disposed and vertically separated with the downstream end of each auger housing connected to the upstream end of the next downstream auger housing by a tubular connector, the auger housing of the first auger being connected to the grain inlet, and the auger housing of the last auger being connected to the grain outlet.

14. The apparatus for heat processing of foodstuffs of claim 13 wherein:

said auger shafts extend outwardly of one of the side walls and carry sprockets, a chain interconnecting the sprockets, a variable speed drive motor, a power sprocket connected to the drive motor and connected to the chain for powering the drive sprockets of the auger shafts.

15. The apparatus for heat processing of foodstuffs of claim 13 wherein:

said heater module is comprised as a burner and including means for regulation of the burner.

16. The apparatus for heat processing of foodstuffs of claim 15 wherein:

said burner control includes a temperature sensor located in said fluid conduit to sense temperature of gases in the fluid conduit and regulate the burner accordingly.

17. The apparatus for heat processing of foodstuffs of claim 10 wherein:

said tubular means and said material conveying means include a stacked bank of augers having interconnected auger housings and each having an auger shaft, said shaft carrying an auger flight within the auger housing for movement of foodstuffs therein in a downstream direction toward the material outlet;

power means for simultaneously powering the auger shafts;

said heater module being comprised as a burner and including means for regulation of the burner.

18. The apparatus for heat processing of foodstuffs of claim 17 wherein:

said means for regulation of the burner includes a temperature sensor located in said fluid conduit to sense temperature of gases in the fluid conduit and regulate the burner accordingly.

19. The apparatus for heat processing of foodstuffs of claim 18 including:

a moisture conditioning means connected to the material inlet of the oven housing outside of the housing, to raise the moisture content of foodstuff intended for heat processing to a preselected target moisture content.

20. An apparatus for heat processing of foodstuffs comprising:

a moisture conditioning apparatus to raise the moisture content of foodstuff intended for heat processing, to a preselected target moisture content through the controlled addition of moisture derived at least in part from a water supply, as the foodstuff moves in a downstream direction from an inlet location to an outlet location, including first material conveying means moving foodstuff in said downstream direction between the inlet location and the outlet location;

a moisture sensor of the type to continuously monitor moisture content of foodstuff and convert the measurement into a first electronic signal, positioned at a sensing station located to intercept a sample of passing foodstuff for substantially continuous measurement of the moisture content of the sample and translation of the measurement into an electronic signal;

liquid applicator means located at a wetting station along the path of travel of the foodstuff on the material conveying means between the inlet and the outlet, positioned to disperse liquid upon passing foodstuff derived at least in part from said water supply;

a liquid supply line connected to the liquid applicator means for connection to the water supply;

a proportional flow control valve connected in the liquid supply line having an electronically actuated valve control moveable between relatively open and relatively closed positions to regulate the amount of liquid flow to the liquid applicator means for application to passing feed grain;

means connecting the moisture sensor to the valve control so that the valve control operates responsive to the electronic signal generated by the moisture sensor according to the difference between the moisture content of the grain sample as sensed by the moisture sensor and the target moisture content;

an oven housing having side walls defining a closed oven chamber;

a material inlet to the oven chamber at an upper portion thereof, said material inlet to the oven chamber being connected to the outlet location of the moisture conditioning apparatus to receive foodstuff having been conditioned at the moisture conditioning apparatus to raise the moisture content thereof to a preselected target moisture content;

a material outlet from the oven chamber at a lower portion thereof;

tubular means located in the oven chamber connected at one end to the material inlet and at another end to the material outlet and being enclosed within the oven chamber, for movement of foodstuffs between the material inlet and the material outlet while exposing the foodstuffs to heat for purposes of heat processing it;

a second material conveying means associated with the tubular means;

a fluid conduit for the circulation of heated gases through the oven chamber, including a fluid inlet duct connected to the oven housing and open to a lower portion of the oven chamber, a recirculation duct connected to the oven housing at an upper portion thereof and open to the oven chamber, a plenum housing having a plenum chamber, a blower, the downstream end of the recirculation duct being connected to the plenum housing, said plenum housing being connected to the blower and said blower being connected to the fluid inlet duct;

a heater module connected to the plenum housing to provide heated gases to the plenum housing.

21. The apparatus for heat processing of foodstuffs of claim 20 wherein:

said tubular means and said second material conveyor means include a heat processing auger assembly.

22. The apparatus for heat processing of foodstuffs of claim 21 wherein:

said heat processing auger assembly includes a bank of heat processing augers having interconnected auger housings and each auger also having an auger shaft, said shaft carrying an auger flight within the auger housing for movement of foodstuffs therein in a downstream direction toward the material outlet of the oven housing.

23. The apparatus for heat processing of foodstuffs of claim 22 wherein:

said heater module includes a burner and including control means for regulation of the burner, said control means including a temperature sensor located in said fluid conduit to sense the temperature of the gases in the fluid conduit and regulate the burner accordingly.

24. The apparatus for heat processing of foodstuffs of claim 20 including:

an additive supply means to supply liquid additive for mixture with the water for application to the feed grain, means connecting the additive supply means to the liquid supply line for mixture of additive and water preparatory to application to the grain.

25. The apparatus for heat processing of foodstuffs of claim 20 wherein:

said sensing station of the moisture conditioning apparatus is located upstream of the wetting station.

* * * * *